United States Patent [19]

Volpeliere

[11] 3,964,793
[45] June 22, 1976

[54] CONTINUOUS FLOW PNEUMATIC CONVEYOR SYSTEM EMPLOYING A FLUIDIZED BED COLUMN FOR THE PURPOSES OF CONTROL AND REGULATION

[75] Inventor: Jacky Volpeliere, Mimet, France
[73] Assignee: Aluminium Pechiney, Lyon, France
[22] Filed: July 1, 1974
[21] Appl. No.: 484,669

[30] Foreign Application Priority Data
July 2, 1973 France .............................. 73.24134

[52] U.S. Cl. ................................... 302/3; 302/35; 302/42; 302/52
[51] Int. Cl.² ................. B65G 53/66; B65G 53/18
[58] Field of Search ............... 302/3, 35, 40, 42, 52, 302/66; 222/52, 55, 57, 193

[56] References Cited
UNITED STATES PATENTS

| | | | |
|---|---|---|---|
| 2,827,333 | 3/1958 | Wallin | 302/42 |
| 2,916,441 | 12/1959 | Kruse | 222/55 |
| 3,202,320 | 8/1965 | Patton | 222/57 |

*Primary Examiner*—John J. Love
*Assistant Examiner*—Jeffrey V. Nase
*Attorney, Agent, or Firm*—McDougall, Hersh & Scott

[57] ABSTRACT

The invention relates to the pneumatic conveyance of powdered materials comprising a conveyor duct balanced by a fluidized feed column and a transfer chamber, the gravimetric rate of flow of material is regulated by a means of control designed to maintain a set value of pressure in the feed circuit to an injector by means of a device controlling the supply to the feed column.

4 Claims, 1 Drawing Figure

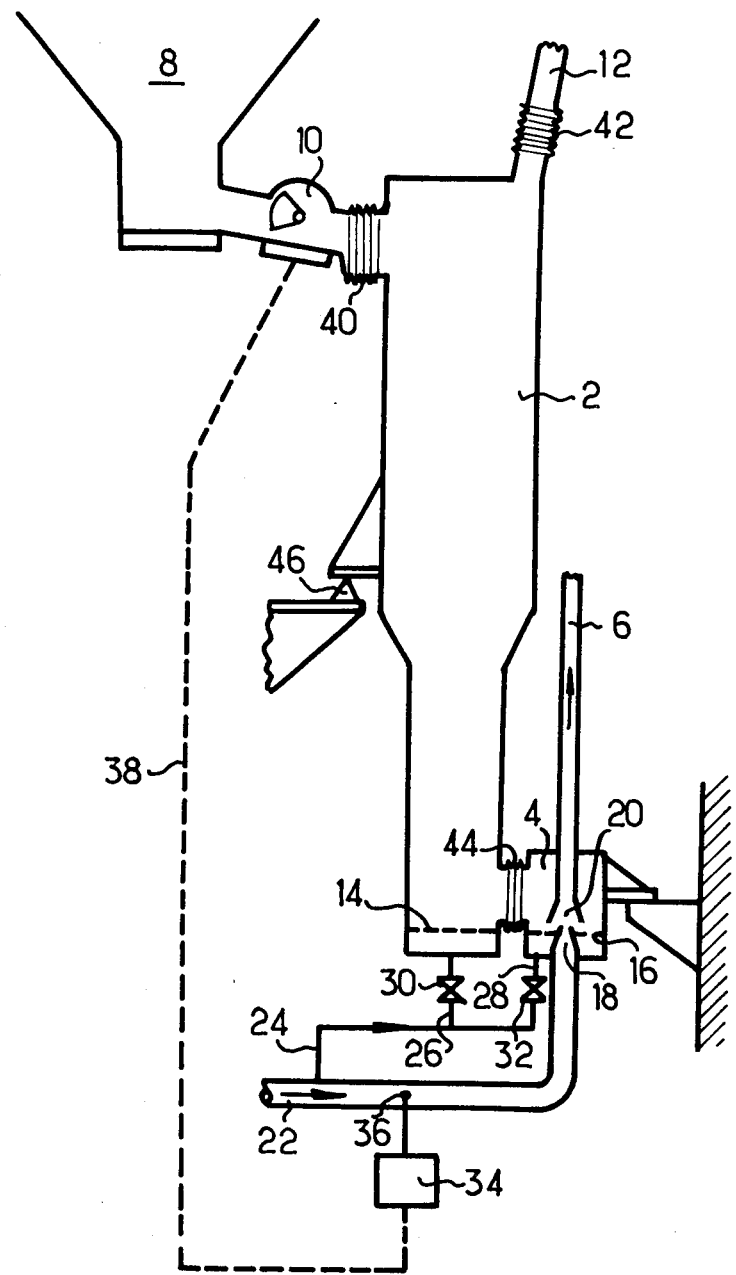

CONTINUOUS FLOW PNEUMATIC CONVEYOR SYSTEM EMPLOYING A FLUIDIZED BED COLUMN FOR THE PURPOSES OF CONTROL AND REGULATION

The invention relates to a method of regulating the gravimetric rate of flow of powdered or similar materials in a pneumatic conveyor system balanced by means of a fluidized bed feed column and to an installation for the application of the said method.

Those versed in the art are aware of the difficulties of metering powders which difficulties can arise from "flooding", a phenomenon which adversely affects the proper operation of flow control systems and leads to volatilization of the powder. Conventional metering systems of the "batch" or "weighing belt" type, to quote two examples, generally involve an undue number of handling operations.

It is an object of this invention to provide a method and installation which enables these shortcomings to be overcome while achieving at one and the same time the dual objectives of metering and conveying a material.

A method of pneumatic conveyance of powdered materials is already known whereby the pneumatic conveyor duct is fed with powder flowing from a column of fluidized powder and the pressure of air blown in by an injector is balanced by the height of the column of powdered material.

It has been observed that if the column is supplied with a constant flow of material and the feed system is well designed (e.g. a symmetrical annular feed system), the material is conveyed at a constant rate and the system is stable. In this event, the pressure of the gas is constant and the height of material in the column is constant.

If the rate of supply to the column is varied, the height of fluidized material in the column and the pressure of the gas vary with the rate of flow and the system is governed by the following relationships:

1. The column loading in terms of the weight of fluidized material at the injector is at all times balanced by the gas pressure minus the pressure drop through the injector.

2. There is a one-to-one relationship between the flow of material and the air pressure at the injector (variation of pressure drop in the conveyor circuit) and this is virtually proportional around the region of operation for which the installation has been designed.

This being so, for any gravimetric rate of flow of gas, the pressure in the injection region can be controlled by regulating the quantity of material introduced into the feed column and a constant rate of flow thus obtained.

The invention relates to a method of regulating the gravimetric rate of flow of powdered or similar materials in a continuous pneumatic conveyor system, using gas injection, and balanced by a fluidized bed feed column whereby, for any given gravimetric rate of flow of gas, the pressure of the gas injected is determined and the quantity of powdered material introduced into the said fluidized bed column is regulated in order to maintain the said pressure at a set value.

The invention also relates to an installation for the application of the said method.

According to one application of the invention, the powdered materials from the fluidized feed column pass to the pneumatic conveyor duct via a transfer chamber comprising a means of fluidization, a gas injector and the pneumatic conveyor induction orifice consisting of a nozzle located in line with the said gas injector.

A convenient technique is to control the pressure by means of a suitable device designed to regulate the opening of a means of introducing powdered material into the feed column, thus achieving a constant rate of flow and enabling the material in question to be metered.

In this way the rate of flow is regulated by interlocking the means of regulation to a reliable set point and the problem of volatilization no longer exists since the entire installation is pressure-tight and dust free. Again, metering and conveying hot materials involve no special problems since temperature is limited only by the performance of the fluidization surfaces, which may be in refractory materials, e.g. asbestos or sintered metal.

The invention will be more clearly understood on perusing the detailed description hereinafter given and examining the drawing, which corresponds to one method of application of the invention, the said method being given as an example only and not constituting a limitation of the scope of the invention.

The drawing is a diagrammatic representation of an installation according to the invention.

The pneumatic conveyor system represented comprises a fluidized feed column 2, a transfer chamber 4 and a pneumatic conveyor duct 6.

The fluidized feed column 2 is supplied with the powdered material from a bin 8 via a controlled opening device, such as a controlled opening hood 10. Column 2 also comprises a degassing line 12 and a fluidization plate 14.

The powdered material passes from column 2 to the pneumatic conveyor duct 6 via the transfer chamber 4, which comprises a fluidization plate 16, a gas injector 18 and the conveyor duct 6 inlet orifice consisting of a nozzle 20 positioned in line with the injector 18.

The feed column 2 and transfer chamber 4 fluidization gas is taken from the injector 18 feed pipe 28 via a pipe 24 ending in two branch pipes 26 and 28 which supply fluidization plates 14 and 16. Means of regulation, such as valves 30 and 32 enable the flow rates of the fluidization gas to be regulated.

Pressure control devices 34 are used to determine pressure in line 22 at a point 36 upstream of injector 18. Such control devices 34, which may be of any known type, preferably comprise means of setting and regulating a control value and maintaining the latter by regulating the opening of the control device 10 and hence the quantity of powdered material supplied to column 2 by means of an interlock system represented diagrammatically by the dotted line 38.

The installation operates as follows:

The weight of the fluidized material in column 2 is at all times balanced at the injector by the gas pressure, after allowing for the pressure drop in the injector 18, and there is a one-to-one relationship between the rate of flow of material and the air pressure at the injector. It is possible to select a region of operation such that this relationship is virtually proportional.

A constant rate of flow of powdered material is obtained as follows: The gravimetric rate of flow of gas supplied by a volumetric apparatus (e.g. of the Roots type) being known, the corresponding value of pressure is set by means of the control device 34, which continuously regulates the opening of the column supply system 10.

Needless to say, it is necessary to carry out a calibration to allow for variations of air temperature, particle size of the material, type of material involved, etc. Calibration may be carried out in various ways, the pressure set point being held constant during the operations in question, e.g. as follows:

1. By measurement of volume, by emptying the upstream bin 8 or filling a downstream bin, any movement of material into or out of the bin in question being arrested during the period concerned.

2. By measurement of weight; this is more accurate in that it eliminates errors of density.

a. By weighing supply bin 8 or a receiving bin, the extraction process being temporarily shut down.

Both of these methods involve stoppages which may not be convenient.

b. By weighing feed column 2, in which case the difference $\Delta P$ by weight $P$ after tightly closing the feed control device 10. for a short time $\Delta t$ determines the gravimetric rate of flow, i.e.

$$Q = \Delta P/\Delta t$$

for pressure $P - \Delta P/2$

Preferably, the means of control also include a method of correcting the pressure set point in order to comply with the rate of flow selected.

This correction may be carried out at fairly frequent intervals, as determined by the accuracy sought, and has only a very slight effect on flow rate. The system may be completed by in integrator which calculates the total weight of material passed.

Where the calibration is carried out according to method 2b above, the feed column 2 is connected to the other parts of the installation by means of flexible sleeves 40, 42, 44 and the feed column 2 rests on weighing machines, only one of which 46 has been represented, while the transfer chamber is firmly clamped to obviate any transmission of dynamic stress to column 2.

Needless to say, the invention is no way limited to the method of application described and represented herein. Many variations may be introduced by those versed in the art, according to the application envisaged and without departing from the principle of the invention.

For example, an installation of the type described will normally be operated with air but may also be operated with any other gas, whether inert or reactive. A reaction may take place while the material is being conveyed. Thus, the powder may be a catalyst for a gas mixture or a substance which reacts with the gas.

I claim:

1. A system for the pneumatic conveyance of powdered materials comprising:
    a. a fluidizing feed column;
    b. valve means for metering powdered material into said feed column;
    c. means for fluidizing said materials;
    d. a pneumatic conveyor duct having an inlet;
    e. a transfer chamber through which the fluidized materials pass from the feed column to the pneumatic conveyor duct inlet;
    f. a gas injector connected to a source of pressurized gas for conveying the fluidized materials in the transfer chamber into the conveyor duct inlet; and
    g. means for detecting the pressure of the gas injected by said injector and for controlling said valve means to regulate the rate of entry of powdered material into said feed column in proportion to the detected gas pressure.

2. The system of claim 1 wherein said means for fluidizing include:
    a. fluidizing plates locates in said column and said transfer chamber; and
    b. means for supplying gas to said plates from said gas source.

3. The system of claim 1 wherein said fluidized feed column is connected to said valve means and said transfer chamber through flexible conduit and further includes:
    means for weighting only the feed column
    whereby the system may be calibrated by weighting the column with said valve means closed for a time period $\Delta t$, so a weight difference $\Delta W$ over said $\Delta t$ period of the column determines the gravimetric rate of flow for a specified pressure.

4. A method for the pneumatic conveyance of powdered materials comprising the steps of:
    a. metering powdered material into a fluidizing feed column;
    b. fluidizing said material;
    c. transferring the fluidized material from the feed column to the inlet of a pneumatic conveyor duct by use of pressurized gas;
    d. detecting the pressure of the gas; and
    e. controlling the rate of entry of said powdered material into said feed column in proportion to the detected gas pressure.

\* \* \* \* \*